United States Patent
Ye

(10) Patent No.: US 11,816,570 B2
(45) Date of Patent: Nov. 14, 2023

(54) METHOD FOR ACCELERATED DETECTION OF OBJECT IN VIDEOS, SERVER, AND NON-TRANSITORY COMPUTER READABLE STORAGE MEDIUM

(71) Applicant: Ping An Technology (Shenzhen) Co., Ltd., Guangdong (CN)

(72) Inventor: Ming Ye, Guangdong (CN)

(73) Assignee: Ping An Technology (Shenzhen) Co., Ltd., Guangdong (CN)

( * ) Notice: Subject to any disclaimer, the term of this patent is extended or adjusted under 35 U.S.C. 154(b) by 409 days.

(21) Appl. No.: 17/167,515

(22) Filed: Feb. 4, 2021

(65) Prior Publication Data

US 2021/0182567 A1 Jun. 17, 2021

Related U.S. Application Data

(63) Continuation of application No. PCT/CN2020/093360, filed on May 29, 2020.

(30) Foreign Application Priority Data

Jun. 17, 2019 (CN) .......................... 201910523099.6

(51) Int. Cl.
*G06N 3/08* (2023.01)
*G06T 3/40* (2006.01)
(Continued)

(52) U.S. Cl.
CPC .............. *G06N 3/08* (2013.01); *G06F 18/10* (2023.01); *G06F 18/2163* (2023.01); *G06T 3/40* (2013.01);
(Continued)

(58) Field of Classification Search
CPC ....... G06F 18/2163; G06F 18/10; G06T 3/40; G06N 3/08; G06V 20/49; G06V 10/454
See application file for complete search history.

(56) References Cited

U.S. PATENT DOCUMENTS 11,257,198 B1 * 2/2022 Holub .................... G06V 10/82
2006/0257048 A1 * 11/2006 Lin ......................... G06V 20/40
382/276
(Continued)

FOREIGN PATENT DOCUMENTS

CN 108230357 A 6/2018
CN 108830246 A 11/2018
(Continued)

OTHER PUBLICATIONS

JPO, Notice of Reasons for Refusal for corresponding Japanese Patent Application No. JP2021-506484, dated Mar. 18, 2022, 10 pages.
(Continued)

*Primary Examiner* — Qun Shen
(74) *Attorney, Agent, or Firm* — IP Spring

(57) ABSTRACT

A method for accelerated detection of objects in videos, a server, and a non-transitory computer readable storage medium are provided. The method realizes the detection of a target object in a video by dividing all frame images in video images into preset groups of frame images, each group of frame images including a keyframe image and a non-keyframe image, using a detection box of a target in the keyframe image to generate a preselection box in the non-keyframe image, and detecting the location of the target in the preselection box.

17 Claims, 2 Drawing Sheets

(51) Int. Cl.
  *G06V 20/40* (2022.01)
  *G06F 18/10* (2023.01)
  *G06F 18/21* (2023.01)
  *G06V 10/764* (2022.01)
  *G06V 10/82* (2022.01)
  *G06V 10/44* (2022.01)

(52) U.S. Cl.
  CPC .......... *G06V 10/454* (2022.01); *G06V 10/764* (2022.01); *G06V 10/82* (2022.01); *G06V 20/40* (2022.01); *G06V 20/46* (2022.01); *G06V 20/49* (2022.01)

(56) References Cited

U.S. PATENT DOCUMENTS

| 2012/0268609 | A1  | 10/2012 | Yoo et al. |           |
| 2019/0108640 | A1* | 4/2019  | Zhang      | G06N 3/084 |
| 2019/0130583 | A1* | 5/2019  | Chen       | G06T 7/194 |
| 2019/0221001 | A1* | 7/2019  | Dassa      | G06N 3/045 |
| 2019/0266409 | A1* | 8/2019  | He         | G06F 18/214 |
| 2019/0304102 | A1* | 10/2019 | Chen       | G06N 20/00 |
| 2020/0143171 | A1* | 5/2020  | Lee        | G06V 20/49 |

FOREIGN PATENT DOCUMENTS

| CN | 109685066 A   | 4/2019  |
| CN | 110427800 A   | 11/2019 |
| JP | 2018-5520 A   | 1/2018  |
| WO | 2012139228 A1 | 10/2012 |

OTHER PUBLICATIONS

CNIPA, International Search Report for International Patent Application No. PCT/CN2020/093360, 2 pages, dated Jul. 28, 2020.

* cited by examiner

METHOD FOR ACCELERATED DETECTION OF OBJECT IN VIDEOS, SERVER, AND NON-TRANSITORY COMPUTER READABLE STORAGE MEDIUM

CROSS-REFERENCE TO RELATED APPLICATIONS

The application is a continuation under 35 U.S.C. § 120 of PCT Application No. PCT/CN2020/093360 filed on May 29, 2020, which claims priority under 35 U.S.C. § 119(a) and/or PCT Article 8 to Chinese Patent Application No. 201910523099.6 filed on Jun. 17, 2019, the disclosures of which are hereby incorporated by reference in their entireties.

TECHNICAL FIELD

The application relates to the field of image recognition technology based on artificial intelligence, in particular to a method for accelerated detection of objects in videos, a server, and a non-transitory computer readable storage medium.

BACKGROUND

With the development of science and technology, camera equipment has been popularized, resulting in the emergence of mass image data and video data. The video data is also getting a lot of attention. Target detection and tracking are needed in many fields, such as surveillance video and tracking with drones.

The traditional target detection method needs to process a video frame by frame as follows: (1) generating a feature map according to a backbone network of each frame; (2) dividing anchor points on the pyramid of the feature map for foreground and background classification and coordinate frame regression; (3) sending a foreground feature map with high score obtained in the previous step into a classification network for secondary classification and coordinate regression, and outputting a result.

The inventor realized that the above method has a problem of low detection speed during processing pictures above 720p due to too many detecting anchor points, and so it was difficult to achieve the real-time detection effect. Therefore, the problem can only be solved by frame skip, which reduces the detection accuracy.

SUMMARY

In view of the above, it is necessary to put forward a method for accelerated detection of objects in videos, a server, and a non-transitory computer readable storage medium.

A method for accelerated detection of objects in videos includes the following operations: dividing all frame images in video images into preset groups of frame images, each group of frame images including a keyframe image and a non-keyframe image; recognizing a detection object in the keyframe image, and marking a detection box on the detection object; recognizing a detection object in the non-keyframe image of the preset group of frame images, scaling up the detection box in the keyframe image at a preset scale to generate a preselection box, and marking the detection object in the non-keyframe image through the preselection box; cropping the non-keyframe image according to the preselection box to obtain multiple preselection box images; inputting the multiple preselection box images into a non-keyframe detection network to obtain a location of the detection object in the preselection box; and mapping the detection object to an original image corresponding to the non-keyframe according to the location of the detection object in the preselection box.

A server includes a processor and a memory. The processor, when executing a computer readable instruction stored in the memory, implements the following steps: dividing all frame images in video images into preset groups of frame images, each group of frame images including a keyframe image and a non-keyframe image; recognizing a detection object in the keyframe image, and marking a detection box on the detection object; recognizing a detection object in the non-keyframe image of the preset group of frame images, scaling up the detection box in the keyframe image at a preset scale to generate a preselection box, and marking the detection object in the non-keyframe image through the preselection box; cropping the non-keyframe image according to the preselection box to obtain multiple preselection box images; inputting the multiple preselection box images into a non-keyframe detection network to obtain a location of the detection object in the preselection box; and mapping the detection object to an original image corresponding to the non-keyframe according to the location of the detection object in the preselection box.

A non-transitory computer readable storage medium storing a computer readable instruction are provided. The computer readable instruction, when executed by one or more processors, enables the one or more processors to perform the following steps: dividing all frame images in video images into preset groups of frame images, each group of frame images including a keyframe image and a non-keyframe image; recognizing a detection object in the keyframe image, and marking a detection box on the detection object; recognizing a detection object in the non-keyframe image of the preset group of frame images, scaling up the detection box in the keyframe image at a preset scale to generate a preselection box, and marking the detection object in the non-keyframe image through the preselection box; cropping the non-keyframe image according to the preselection box to obtain multiple preselection box images; inputting the multiple preselection box images into a non-keyframe detection network to obtain a location of the detection object in the preselection box; and mapping the detection object to an original image corresponding to the non-keyframe according to the location of the detection object in the preselection box.

BRIEF DESCRIPTION OF THE DRAWINGS

In order to more clearly illustrate the technical solution in the embodiment of the application or a related art, the accompanying drawings needed in description of the embodiments or the related art are simply introduced below. It is apparent for those of ordinary skill in the art that the accompanying drawings in the following description are only embodiments of the application, and some other accompanying drawings may also be obtained according to the provided accompanying drawings on the premise of not contributing creative effort.

Figure 1:
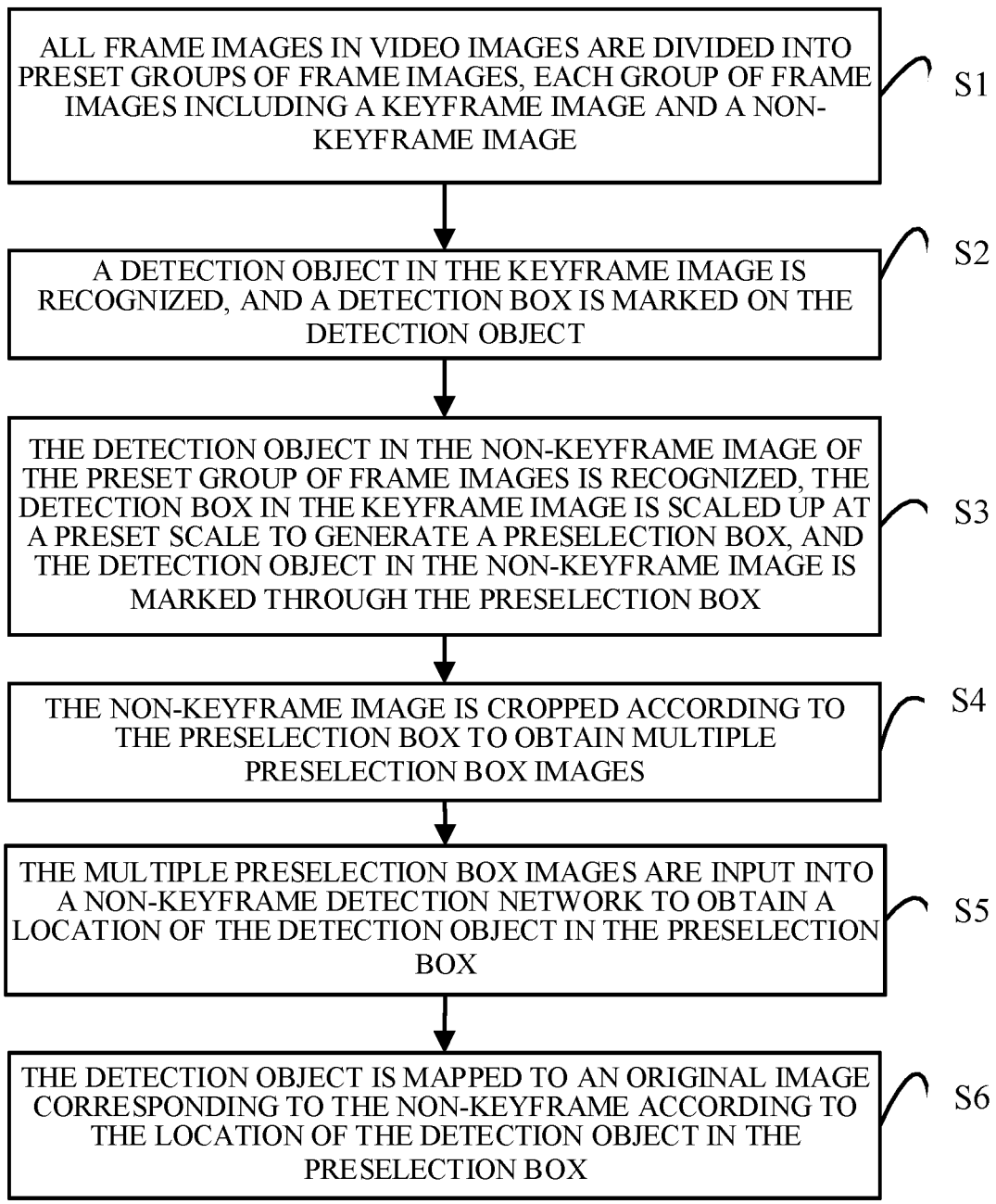
FIG. 1 is a flowchart of a method for accelerated detection of objects in videos provided in the first embodiment of the application.

The application will be further illustrated by the following specific implementation modes in combination with the accompanying drawings.

DETAILED DESCRIPTION OF THE EMBODIMENTS

In order to understand the purposes, characteristics, and advantages of the application more clearly, the application will be described in detail below in combination with the accompanying drawings and the specific embodiments. It is to be noted that the embodiments in the application and characteristics in the embodiments may be combined without conflicts.

Many specific details are set forth in the description below to facilitate full understanding of the application. The described embodiments are only part of the embodiments of the application rather than all of them. All other embodiments obtained by those of ordinary skill in the art based on the embodiments in the application without creative work shall fall within the scope of protection of the application.

Unless otherwise defined, all technical and scientific terms in the specification have the same meaning as those of ordinary skill in the art, belonging to the application, usually understand. The terms in the specification of the application are only used for describing the specific embodiments, but are not intended to limit the application.

The specification and claims of the application and terms "first", "second", "third", etc. in the accompanying drawings are used for distinguishing different objects rather than describing a specific sequence. In addition, term "include" and any transformations thereof are intended to cover non-exclusive inclusions. For example, a process, method, system, product, or device including a series of steps or units is not limited to the steps or units which have been listed but optionally further includes steps or units which are not listed or optionally further includes other steps or units intrinsic to the process, the method, the product, or the device.

A method for accelerated detection of objects in videos in the embodiments of the application is applied in a hardware environment comprising of at least one server and a mobile terminal connected to the server through networks. The networks include, but not limited to, a wide area network, a metropolitan area network, or a local area network. The method for accelerated detection of objects in videos in the embodiments of the application may be implemented by the server, or by the mobile terminal, or by both the server and the mobile terminal.

For the server needing to perform the method for accelerated detection of objects in videos, a function for accelerated detection of objects in videos provided by method of the application may be directly integrated on the server, or a client for implementing the method of the application is installed. For another example, the method provided in the application may also run on the server and other devices in the form of Software Development Kit (SDK). An interface of the function for accelerated detection of objects in videos is provided in the form of SDK, and the server and other devices may realize the function for accelerated detection of objects in videos through the provided interface.

Embodiment 1

FIG. 1 is a flowchart of a method for accelerated detection of objects in videos provided in the first embodiment of the application. The method may be implemented by a server (such as a server 3 which will be hereinafter described in FIG. 3). The server may be, for example, a cloud server. According to different requirements, the sequence of execution in the flowchart may be changed and some steps may be omitted.

At S1, all frame images in video images are divided into preset groups of frame images, each group of frame images including a keyframe image and a non-keyframe image.

Specifically, all the frame images in the video images may be divided into the preset groups of frame images. Each group of frame images includes consecutive preset frame images. The first frame image in the consecutive preset frame images is the keyframe image, and the remaining frame images are the non-keyframe images.

For example, the video image with 50 frames is divided into 10 groups of frame images, five consecutive frame images are in a group, in which the first frame image is the keyframe image, and the second to the fifth frame images are the non-keyframe images. Each keyframe image corresponds to an original image in the video image, and each non-keyframe image also corresponds to an original image in the video image. The original image is an image above 720p.

It is understandable that the number of images in each group of frame images is not limited, and the number of the keyframe images and non-keyframe images in each group of frame images is not limited too.

When it is necessary to accurately detect a target in a video image, the number of preset groups of frame images may be appropriately increased, and correspondingly, the number of image frames in each group of frame images is appropriately reduced. For example, the video image with 60 frames is divided into 20 groups of frame images, that is, consecutive three frame images of all the frame images in the video image are divided into a group.

When the detection accuracy of the target in the video image is not high, the number of preset groups of frame images may be appropriately reduced, and correspondingly, the number of image frames in each group of frame images is appropriately increased. For example, the video image with 60 frames is divided into 10 groups of frame images, that is, consecutive 6 frame images of all the frame images in the video image are divided into a group.

In the implementation mode, before all the frame images in the video image are divided into the preset groups of frame images, the method for accelerated detection of objects in videos further includes the following step: receiving video image collected by a camera is received, and decoding the video image.

In the implementation mode, the video image is collected by the camera. The camera communicates with the server through a wired or wireless network. The camera sends the collected video image to the server through the wired or wireless network.

At S2, a detection object in the keyframe image is recognized, and a detection box is marked on the detection object.

In the implementation mode, the detection object may be a person, or an animal, or a vehicle, etc. There may be multiple detection objects in the keyframe image, and each detection object corresponds to the detection box. It is understandable that according to the different detection objects, the size of the corresponding detection box is also different.

In the implementation mode, recognizing the detection object in the keyframe image includes the following operations: sliding on the keyframe images in a preset order through sliding windows with different window sizes; for each sliding, inputting an image corresponding to a current window into a pre-trained classifier; and when the classifier outputs a classification probability greater than a preset value after processing the image corresponding to the current window, confirming that the detection object in the keyframe image is recognized, and outputting the mark of the detection object.

For example, first the current frame images are slid from left to right and from top to bottom through the sliding windows with different window sizes. A classifier (which has been trained) is executed for the current window each time the image is slid. If the current window obtains a high classification probability, it is considered that the target is detected. After all the sliding windows with different window sizes are detected, target marks detected by different windows will be obtained, and there will be some parts with higher repetition in these window sizes. A Non-Maximum Suppression (NMS) method is used to filter to obtain the detection object in the keyframe image at last. Finally, the detected target is obtained after NMS filtering.

Filtering the marks of the detection objects to obtain the detection object in the keyframe image includes the following operations: arranging probabilities obtained after inputting the sliding windows into the classifier in a descending order, and selecting a sliding window corresponding to the maximum classification probability; respectively calculating overlapping areas between the other sliding windows and the sliding window corresponding to the maximum classification probability, and determining whether the overlapping areas are greater than a preset area; for an overlapping area less than or equal to the preset area, retaining a corresponding sliding window and outputting a detection object corresponding to the sliding window; and for an overlapping area greater than the preset area, deleting a corresponding sliding window.

The above steps are repeated until all the other sliding windows are compared.

At S3, the detection object in the non-keyframe image of the preset group of frame images is recognized, the detection box in the keyframe image is scaled up at a preset scale to generate a preselection box, and the detection object in the non-keyframe image is marked through the preselection box.

It is understandable that the method for recognizing the detection object in the current non-keyframe image may be consistent with the method for recognizing the detection object in the keyframe image, so it will not be repeated here.

In the implementation mode, the detection object in each non-keyframe image of each group of frame images is recognized. The previous frame image may be the keyframe image or the non-keyframe image.

Recognizing the detection object in the non-keyframe image of the preset group of frame images, scaling up the detection box in the keyframe image at a preset scale to generate the preselection box, and marking the detection object in the non-keyframe image through the preselection box includes the following steps: recognizing the detection object in a current non-keyframe image of the preset group of frame images; scaling up the detection box in the keyframe image previous to the current non-keyframe image at a preset scale to generate a preselection box, and marking the detection object in the current non-keyframe image through the preselection box; recognizing the detection object in the non-keyframe image next to the current non-keyframe image; and scaling up the preselection box in the current non-keyframe image at a preset scale to generate a first preselection box, and marking the detection object in the non-keyframe image next to the current non-keyframe image through the first preselection box, and so on, until detection objects in all non-keyframe images of the preset groups of frame images are marked.

For example, if five consecutive frame images are in a group, the first frame image of the five frame images is the keyframe image, and the second to the fifth frame images are the non-keyframe images. The detection object in the first frame image which is the keyframe image is recognized, and the detection box is marked on the detection object. The detection object in the second frame image which is the non-keyframe image is recognized, the detection box in the keyframe image is scaled up at a preset scale to generate a first preselection box, and the detection object in the second frame image is marked through the first preselection box. The detection object in the third frame image which is the non-keyframe image is recognized, the detection box (that is, the first preselection box) in the second frame image (the non-keyframe image) is scaled up at a preset scale to generate a second preselection box, and the detection object in the third fame image is marked through the second preselection box. And so on, until all the detection objects in the non-keyframe images of the groups of frame images are marked through the preselection box.

For example, if five consecutive frame images are in a group, the second frame image of the five frame images is the keyframe image, and the first frame image and the third to the fifth frame images are the non-keyframe images. The detection object in the second frame image which is the keyframe image is recognized, and the detection box is marked on the detection object. The detection object in the third frame image which is the non-keyframe image is recognized, the detection box in the keyframe image is scaled up at a preset scale to generate the first preselection box, and the detection object in the third frame image is marked through the first preselection box. The detection object in the fourth frame image which is the non-keyframe image is recognized, the detection box (that is, the first preselection box) in the third frame image (the non-keyframe image) is scaled up at a preset scale to generate the second preselection box, and the detection object in the fourth fame image is marked through the second preselection box. And so on, until all the detection objects in the non-keyframe images of the groups of frame images are marked through the preselection box.

That is, not only the first frame in each group of frame images is qualified as the keyframe image, but other frames may also be used as the keyframe image.

At S4, the non-keyframe image is cropped according to the preselection box to obtain multiple preselection box images.

For example, there are five detection objects in the non-keyframe image. The five detection objects are marked respectively through five preselection boxes, and five preselection box images may be obtained by cropping the non-keyframe image through the five preselection boxes.

When processing the image above 720p, it takes a lot of calculation and time because the image is too large. Therefore, in the implementation mode, the non-keyframe image may be cropped according to the preselection box to obtain the preselection box image, and then the preselection box image is input into the non-keyframe network for processing. In this way, not only a large image may be converted into a small image for processing, but also a non-detection-target area in the large image can be removed, thus the processing speed may be improved.

At S5, the multiple preselection box images are input into a non-keyframe detection network to obtain a location of the detection object in the preselection box.

In the implementation mode, the non-keyframe detection network may be a pre-trained target detection model. The target detection model is used for representing a corresponding relationship between the preselection box image and location information of the detection object included in the preselection box image.

When the preselection box image is input into the target detection model, the location information of the detection object in the preselection box may be determined. That is, the non-keyframe network is the deep learning neural network for obtaining the location of the detection object in the image. Compared with the traditional neural network, the deep learning neural network has more neurons, which can learn a large scale of area target image samples of different location and shapes. At the same time, in a data preparation stage, by means of enhancement transformation, reverse transformation, tonal transformation, scale transformation, noise disturbance, color transformation and other operations may be performed to the same image, so as to generate a variety of training images with different environmental characteristics. In this way, a neural network detector can perform detection with stable performance for area targets in different scenes, environments and shapes, so as to ensure sufficient sample data and avoid the occurrence of over fitting. In addition, the Dropout mechanism of the neural network can randomly eliminate some neurons in the feed-forward operation of the training process, so as to reduce the interdependence among the neural networks, and enable the neural network to have stronger generalization ability and avoid over fitting. The deep learning neural network may be a convolutional neural network, a deep belief network and a stacked automatic encoder.

As an example, the target detection model may be a corresponding relationship table obtained by a person of ordinary skill in the art based on a large number of preselection box images and the detection objects included in the preselection box images, and the corresponding relationship table may reflect the corresponding relationship between the preselection box image and the detection object included in the preselection box image. The target detection model may also be an image recognition model obtained by a person of ordinary skill in the art carrying out supervised training based on the existing artificial neural network.

Preferably, before the multiple preselection box images are input into the non-keyframe detection network, the method for accelerated detection of objects in videos further includes: the multiple preselection box images are scaled.

It is understandable that because the sizes of the detection objects are different, the sizes of the corresponding preselection boxes are also different. In order to rapidly process the image, it is necessary to scale the multiple preselection box images into the images with the approximate size, and then the images with the approximate size are input into the non-keyframe detection network.

In the implementation mode, before preselection box images cropped out of the non-keyframe image are input into the non-keyframe detection network in batch, the preselection box image may be scaled into the images with similar size. Thus, the uniformly sized images are input into the non-keyframe detection network, which is convenient for a non-keyframe detection network to quickly detect the location of the detection object in the preselection box.

For example, there are five detection objects in the current non-keyframe image. The five detection objects are marked respectively through five preselection boxes, and five preselection box images may be obtained by cropping the non-keyframe image through the five preselection boxes. The five preselection box images have different sizes and need to be scaled into five preselection box images with similar size.

At S6, the detection object is mapped to an original image corresponding to the non-keyframe according to the location of the detection object in the preselection box.

It is understandable that the location of the detection object in the preselection box is the location detected after the original image in the video is scaled, so it is required to be mapped to the original image corresponding to the non-keyframe to complete the detection of the target in the video image.

To sum up, the method for accelerated detection of objects in videos provided in the application includes: all the frame images in the video images are divided into the preset groups of frame images, each group of frame images including the keyframe image and the non-keyframe image; the detection object in the keyframe image is recognized, and the detection box is marked on the detection object; the detection object in the non-keyframe image of the preset group of frame images is recognized, the detection box in the keyframe image is scaled up at a preset scale to generate the preselection box, and the detection object in the non-keyframe image is marked through the preselection box; the current non-keyframe image is cropped according to the preselection box to obtain multiple preselection box images; the multiple preselection box images are input into the non-keyframe detection network to obtain the location of the detection object in the preselection box; and the detection object is mapped to the original image corresponding to the non-keyframe according to the location of the detection object in the preselection box.

For the problem that the detection speed of the detection network in a scenario above 720p is low due to too many detecting anchor points, by dividing the video image into the keyframe image and the non-keyframe image and performing a simplified operation on the non-keyframe image, there is no need to perform accurate target detection to each frame image in the video, and the spatial correlation of consecutive frames of the video is fully used, which greatly reduces the time consumption of anchor point classification without losing the accuracy, and greatly optimizes the detection speed basically without reducing the detection performance. In addition, by adjusting the ratio of keyframe to non-keyframe, the requirements of different hardware scenarios may be met without changing the algorithm.

Second Embodiment

Figure 2:
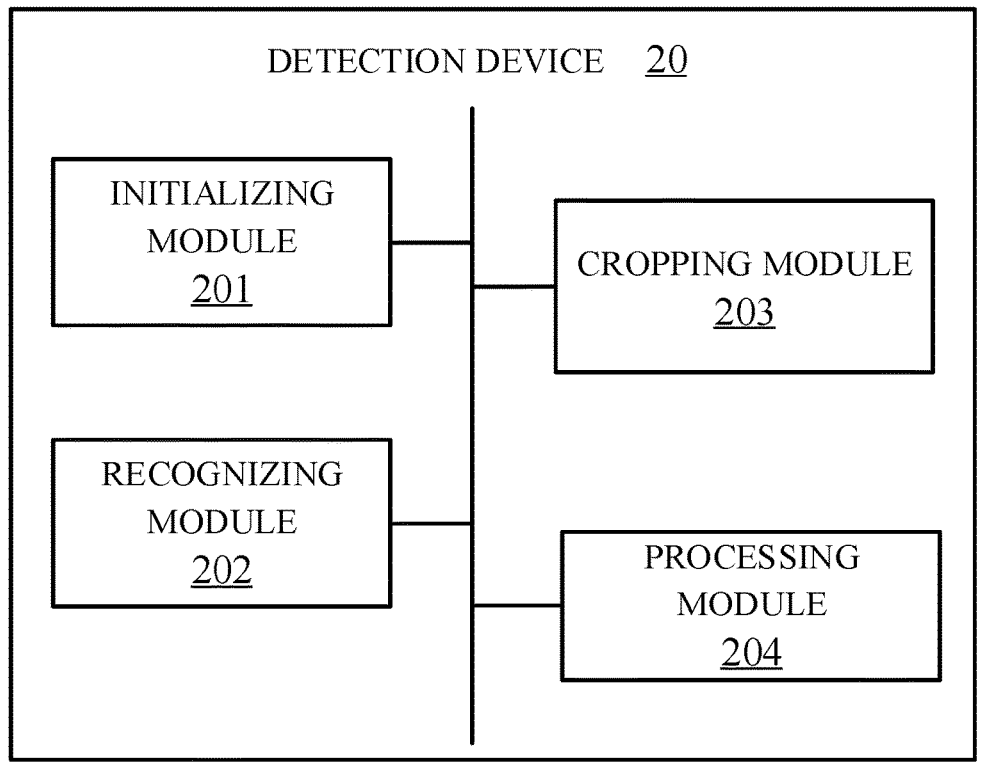
FIG. 2 is a schematic diagram of functional modules in a preferred embodiment of a device for accelerated detection of objects in videos provided in the second embodiment of the application.

FIG. 2 is a schematic diagram of functional modules in a preferred embodiment of a device for accelerated detection of objects in videos in the application.

In some embodiments, the device 20 for accelerated detection of objects in videos (hereinafter referred to as "detection device 20") runs in the server. The detection device 20 may include multiple functional modules composed of program code segments. The program code of each program segment in the detection device 20 may be stored in a memory and executed by at least one processor to perform (see FIG. 1 and related descriptions) the function for accelerated detection of objects in videos.

In the embodiment, the detection device 20 may be divided into multiple functional modules according to the functions it performs. The functional modules may include: an initializing module 201, a recognizing module 202, a cropping module 203 and a processing module 204. The module referred to in the application is a series of computer-readable instructions capable of being executed by at least one processor and capable of performing fixed functions, which are stored in the memory. In some embodiments, the functions of each module will be described in detail in subsequent embodiments.

The initializing module 201 is configured to divide all the frame images in the video images into the preset groups of frame images, each group of frame images including the keyframe image and the non-keyframe image.

Specifically, all the frame images in the video images may be divided into the preset groups of frame images. Each group of frame images includes consecutive preset frame images. The first frame image in the consecutive preset frame images is the keyframe image, and the remaining frame images are the non-keyframe images.

For example, the video image with 50 frames is divided into 10 groups of frame images, five consecutive frame images are in a group, in which the first frame image is the keyframe image, and the second to the fifth frame images are the non-keyframe images. Each keyframe image corresponds to an original image in the video image, and each non-keyframe image also corresponds to an original image in the video image. The original image is an image above 720p.

It is understandable that the number of images in each group of frame images is not limited, and the number of the keyframe images and non-keyframe images in each group of frame images is not limited too.

When it is necessary to accurately detect a target in a video image, the number of preset groups of frame images may be appropriately increased, and correspondingly, the number of image frames in each group of frame images is appropriately reduced. For example, the video image with 60 frames is divided into 20 groups of frame images, that is, consecutive three frame images of all the frame images in the video image are divided into a group.

When the detection accuracy of the target in the video image is not high, the number of preset groups of frame images may be appropriately reduced, and correspondingly, the number of image frames in each group of frame images is appropriately increased. For example, the video image with 60 frames is divided into 10 groups of frame images, that is, consecutive 6 frame images of all the frame images in the video image are divided into a group.

In the implementation mode, before all the frame images in the video images are divided into the preset groups of frame images, the device 20 for accelerated detection of objects in videos may also receive a video image collected by the camera and decode the video image.

In the implementation mode, the video image is collected by the camera. The camera communicates with the server through a wired or wireless network. The camera sends the collected video image to the server through the wired or wireless network.

The recognizing module 202 is configured to recognize the detection object in the keyframe image, and mark the detection box on the detection object.

In the implementation mode, the detection object may be a person, or an animal, or a vehicle, etc. There may be multiple detection objects in the keyframe image, and each detection object corresponds to a detection box. It is understandable that according to the different detection objects, the size of the corresponding detection box is also different.

In the implementation mode, recognizing the detection object in the keyframe image includes the following operations: sliding on the keyframe images in a preset order through sliding windows with different window sizes; for each sliding, inputting an image corresponding to a current window into a pre-trained classifier; and when the classifier outputs a classification probability greater than a preset value after processing the image corresponding to the current window, confirming that the detection object in the keyframe image is recognized, and outputting the mark of the detection object.

For example, first the current frame images are slid from left to right and from top to bottom through the sliding windows with different window sizes. A classifier (which has been trained) is executed for the current window each time the image is slid. If the current window obtains a high classification probability, it is considered that the target is detected. After all the sliding windows with different window sizes are detected, the target marks detected by different windows will be obtained, and there will be some parts with higher repetition in these window sizes. The NMS method is used to filter to obtain the detection object in the keyframe image at last. Finally, the detected target is obtained after NMS filtering.

Filtering the marks of the detection objects to obtain the detection object in the keyframe image includes the following operations: arranging probabilities obtained after inputting the sliding windows into the classifier in a descending order, and selecting a sliding window corresponding to the maximum classification probability; respectively calculating overlapping areas between the other sliding windows and the sliding window corresponding to the maximum classification probability, and determining whether the overlapping areas are greater than a preset area; for an overlapping area less than or equal to the preset area, retaining a corresponding sliding window and outputting the detection object corresponding to the sliding window; and for an overlapping area greater than the preset area, deleting a corresponding sliding window.

The above steps are repeated until all the other sliding windows are compared.

The recognizing module 202 is further configured to recognize the detection object in the non-keyframe image of the preset group of frame images, scale up the detection box in the keyframe image at a preset scale to generate the preselection box, and mark the detection object in the non-keyframe image through the preselection box.

It is understandable that the method for recognizing the detection object in the current non-keyframe image may be consistent with the method for recognizing the detection object in the keyframe image, so it will not be repeated here.

In the implementation mode, the detection object in each non-keyframe image of each group of frame images is recognized. The previous frame image may be the keyframe image or the non-keyframe image.

Recognizing the detection object in the non-keyframe image of the preset group of frame images, scaling up the detection box in the keyframe image at a preset scale to generate the preselection box, and marking the detection object in the non-keyframe image through the preselection box includes the following steps: recognizing the detection object in a current non-keyframe image of the preset group of frame images; scaling up the detection box in the keyframe image previous to the current non-keyframe image at a preset scale to generate a preselection box, and marking the detection object in the current non-keyframe image through the preselection box; recognizing the detection object in the non-keyframe image next to the current non-keyframe image; and scaling up the preselection box in the current non-keyframe image at a preset scale to generate a first preselection box, and marking the detection object in the non-keyframe image next to the current non-keyframe image through the first preselection box, and so on, until the detection objects in all non-keyframe images of the preset groups of frame images are marked.

For example, if five consecutive frame images are in a group, the first frame image of the five frame images is the keyframe image, and the second to the fifth frame images are the non-keyframe images. The detection object in the first frame image which is the keyframe image is recognized, and the detection box is marked on the detection object. The detection object in the second frame image which is the non-keyframe image is recognized, the detection box in the keyframe image is scaled up at a preset scale to generate a first preselection box, and the detection object in the second frame image is marked through the first preselection box. The detection object in the third frame image which is the non-keyframe image is recognized, the detection box (that is, the first preselection box) in the second frame image (the non-keyframe image) is scaled up at a preset scale to generate a second preselection box, and the detection object in the third fame image is marked through the second preselection box. And so on, until all the detection objects in the non-keyframe images of the groups of frame images are marked through the preselection box.

For example, if five consecutive frame images are in a group, the second frame image of the five frame images is the keyframe image, and the first frame image and the third to the fifth frame images are the non-keyframe images. The detection object in the second frame image which is the keyframe image is recognized, and the detection box is marked on the detection object. The detection object in the third frame image which is the non-keyframe image is recognized, the detection box in the keyframe image is scaled up at a preset scale to generate the first preselection box, and the detection object in the third frame image is marked through the first preselection box. The detection object in the fourth frame image which is the non-keyframe image is recognized, the detection box (that is, the first preselection box) in the third frame image (the non-keyframe image) is scaled up at a preset scale to generate the second preselection box, and the detection object in the fourth fame image is marked through the second preselection box. And so on, until all the detection objects in the non-keyframe images of the groups of frame images are marked through the preselection box.

That is, not only the first frame in each group of frame images is qualified as the keyframe image, but other frames may also be used as the keyframe image.

The cropping module 203 is configured to crop the non-keyframe image according to the preselection box to obtain multiple preselection box images.

For example, there are five detection objects in the non-keyframe image. The five detection objects are marked respectively through five preselection boxes, and five preselection box images may be obtained by cropping the non-keyframe image through the five preselection boxes.

When processing the image above 720p, it takes a lot of calculation and time because the image is too large. Therefore, in the implementation mode, the non-keyframe image may be cropped according to the preselection box to obtain the preselection box image, and then the preselection box image is input into the non-keyframe network for processing. In this way, not only a large image may be converted into a small image for processing, but also a non-detection-target area in the large image can be removed, thus the processing speed may be improved.

The processing module 204 is configured to input the multiple preselection box images into the non-keyframe detection network to obtain the location of the detection object in the preselection box.

In the implementation mode, the non-keyframe detection network may be the pre-trained target detection model. The target detection model is used for representing a corresponding relationship between the preselection box image and location information of the detection object included in the preselection box image.

When the preselection box image is input into the target detection model, the location information of the detection object in the preselection box may be determined. That is, the non-keyframe network is the deep learning neural network for obtaining the location of the detection object in the image.

Compared with the traditional neural network, the deep learning neural network has more neurons, which can learn a large scale of area target image samples of different location and shapes. At the same time, in a data preparation stage, by means of enhancement transformation, reverse transformation, tonal transformation, scale transformation, noise disturbance, color transformation, and other operations may be performed to the same image, so as to generate a variety of training images with different environmental characteristics. In this way, a neural network detector can perform detection with stable performance for area targets in different scenes, environments, and shapes, so as to ensure sufficient sample data and avoid the occurrence of over fitting. In addition, the Dropout mechanism of the neural network can randomly eliminate some neurons in the feed-forward operation of the training process, so as to reduce the interdependence among the neural networks, and enable the neural network to have stronger generalization ability and avoid over fitting. The deep learning neural network may be the convolutional neural network, the deep belief network and the stacked automatic encoder.

As an example, the target detection model may be a corresponding relationship table obtained by the skilled based on a large number of preselection box images and the detection objects included in the preselection box images, and the corresponding relationship table may reflect the corresponding relationship between the preselection box image and the detection object included in the preselection box image. The target detection model may also be an image recognition model obtained by the skilled carrying out supervised training based on the existing artificial neural network.

Preferably, before the multiple preselection box images are input into the non-keyframe detection network, the device 20 for accelerated detection of objects in videos may also scale the multiple preselection box images.

It is understandable that because the sizes of the detection objects are different, the sizes of the corresponding preselection boxes are also different. In order to rapidly process the image, it is necessary to scale the multiple preselection box images into the images with the approximate size, and then the images with the approximate size are input into the non-keyframe detection network.

In the implementation mode, before preselection box images cropped out of the non-keyframe image are input into the non-keyframe detection network in batch, the preselection box image may be scaled into the images with similar size. Thus, the uniformly sized images are input into the non-keyframe detection network, which is convenient for a non-keyframe detection network to quickly detect the location of the detection object in the preselection box.

For example, there are five detection objects in the current non-keyframe image. The five detection objects are marked respectively through five preselection boxes, and five preselection box images may be obtained by cropping the current non-keyframe image through the five preselection boxes. The five preselection box images have different sizes and need to be scaled into five preselection box images with similar size.

The processing module 204 is further configured to map the detection object to an original image corresponding to the non-keyframe according to a location of the detection object in the preselection box.

It is understandable that the location of the detection object in the preselection box is the location detected after the original image in the video is scaled, so it is required to be mapped to the original image corresponding to the non-keyframe to complete the detection of the target in the video image.

To sum up, the device 20 for accelerated detection of objects in videos provided in the application includes the initializing module 201, the recognizing module 202, the cropping module 203, and the processing module 204. The initializing module 201 is configured to divide all the frame images in the video images into the preset groups of frame images, each group of frame images including the keyframe image and the non-keyframe image. The recognizing module 202 is configured to recognize the detection object in the keyframe image, and mark the detection box on the detection object. The recognizing module 202 is further configured to recognize the detection object in the non-keyframe image of the preset group of frame images, scale up the detection box in the keyframe image at a preset scale to generate the preselection box, and mark the detection object in the non-keyframe image through the preselection box. The cropping module 203 is configured to crop the non-keyframe image according to the preselection box to obtain multiple preselection box images. The processing module 204 is configured to input the multiple preselection box images into the non-keyframe detection network to obtain the location of the detection object in the preselection box. The processing module 204 is further configured to map the detection object to the original image corresponding to the non-keyframe according to the location of the detection object in the preselection box.

For the problem that the detection speed of the detection network in a scenario above 720p is low due to too many detecting anchor points, by dividing the video image into the keyframe image and the non-keyframe image and performing a simplified operation on the non-keyframe image, there is no need to perform accurate target detection to each frame image in the video, and the spatial correlation of consecutive frames of the video is fully used, which greatly reduces the time consumption of anchor point classification without losing the accuracy, and greatly optimizes the detection speed basically without reducing the detection performance.

In addition, by adjusting the ratio of keyframe to non-keyframe, the requirements of different hardware scenarios may be met without changing the algorithm.

The integrated unit realized in form of a software functional module may be stored in a computer-readable storage medium. The software functional module is stored in a storage medium and includes some instructions to enable a piece of computer equipment (which may be a personal computer, a dual-screen device, or a network device, etc.) or a processor to execute the part of the method described in each embodiment of the application.

Third Embodiment

Figure 3:
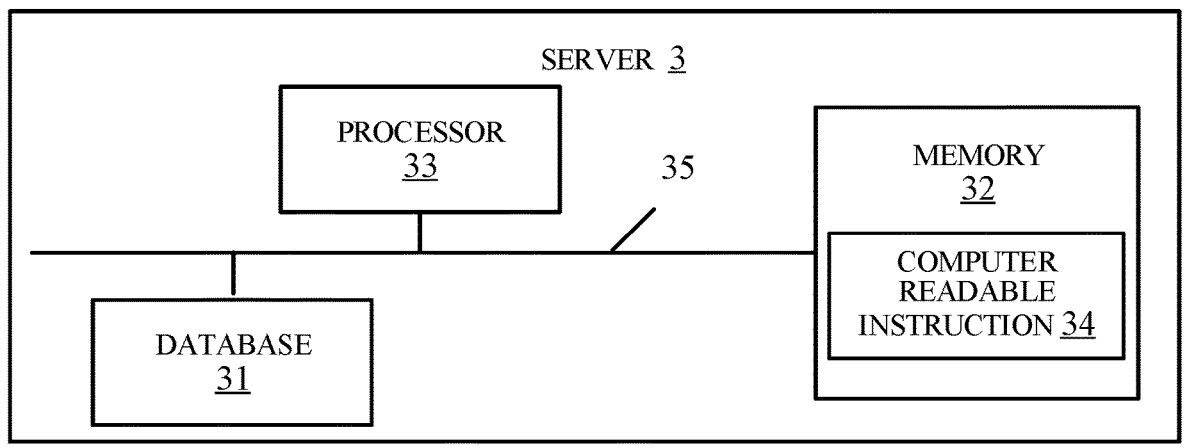
FIG. 3 is a schematic diagram of a server provided by the third embodiment of the application.

FIG. 3 is a schematic diagram of a server provided by the third embodiment of the application.

The server 3 includes: a database 31, a memory 32, at least one processor 33, a computer readable instruction 34 stored in the memory 32 and capable of running on the at least one processor 33, and at least one communication bus 35.

The at least one processor 33, when executing the computer readable instruction 34, implements the steps in the embodiment of the method for accelerated detection of objects in videos.

Exemplarily, the computer readable instruction 34 may be divided into one or more modules/units that are stored in the memory 32 and executed by the at least one processor 33 to complete the application. The one or more modules/units may be a series of computer-readable instruction segments capable of completing a specific function. The instruction segments are used for describing the execution of the computer-readable instruction 34 in the server 3.

The server 3 is a device capable of automatically performing numerical calculation and/or information processing according to the instructions set or stored in advance, and its hardware includes, but not limited to, a microprocessor, an Application Specific Integrated Circuit (ASIC), a Field-Programmable Gate Array (FPGA), a Digital Signal Processor (DSP), an embedded device, etc. Those of ordinary skill in the art may understand that the schematic diagram 3 is only an example of the server 3 and does not form a limit to the server 3. The server may include more or fewer parts than shown, or some combination of parts, or different parts. For example, the server 3 may also include an input/output device, a network access device, a bus, etc.

The database 31 is a storage established on the server 3 to organize, store, and manage data in terms of data structures. There are usually three kinds of database, which are hierarchical database, network database, and relational database. In the implementation mode, the database 31 is used for storing the video image.

The at least one processor 33 may be a Central Processing Unit (CPU), and may also be other universal processor, a Digital Signal Processor (DSP), an ASIC, an FPGA or other programmable logic devices, discrete gates or transistor logic devices, and discrete hardware component, etc. The processor 33 may be a microprocessor or the processor 33 may be any conventional processor. The processor 33 is the control center of the server 3, which connects various parts of the entire server 3 with various interfaces and lines.

The memory 32 may be used to store the computer readable instructions 34 and/or modules/units. The processor 33 realizes the various functions of the server 3 by running or executing the computer readable instructions and/or modules/units stored in the memory 32 and by calling the data stored in the memory 32. The memory 32 may mainly include a program storage area and a data storage area. The program storage area may store an operating system and an application program required for at least one function (such as sound playback and image playback). The data storage area may store data created based on the use of the server 3 (such as audio data and phone book). In addition, the memory 32 may include a high-speed random access memory and may also include a nonvolatile memory, for example, a hard disk, a memory, a plug-in hard disk, a Smart Media Card (SMC), a Secure Digital (SD) card, a flash card, at least one disk storage device, a flash storage device, or other volatile solid state storage device.

The memory 32 stores a program code, and the at least one processor 33 can call the program code stored in the memory 32 to perform relevant functions. For example, the modules (the initializing module 201, the recognizing module 202, the cropping module 203 and the processing module 204) in FIG. 2 are the program codes stored in the memory 32 and executed by the at least one processor 32 to realize the function of each module, so as to achieve the purpose of accelerated detection of objects in videos.

The initializing module 201 is configured to divide all the frame images in the video images into the preset groups of frame images, each group of frame images including the keyframe image and the non-keyframe image; the recognizing module 202 is configured to recognize the detection object in the keyframe image, and mark the detection box on the detection object; the recognizing module 202 is further configured to recognize the detection object in the non-keyframe image of the preset group of frame images, scale up the detection box in the keyframe image at a preset scale to generate the preselection box, and mark the detection object in the non-keyframe image through the preselection box; the cropping module 203 is configured to crop the non-keyframe image according to the preselection box to obtain multiple preselection box images; the processing module 204 is configured to input the multiple preselection box images into the non-keyframe detection network to obtain a location of the detection object in the preselection box; and the processing module 204 is further configured to map the detection object to an original image corresponding to the non-keyframe according to the location of the detection object in the preselection box.

If the modules/units integrated on the server 3 are implemented in the form of software function unit, and are sold or used as independent products, they can also be stored in a computer readable storage medium. Based on the understanding, all or a part of flows of the method in the above embodiments may also be completed by related hardware instructed by a computer readable instruction. The computer readable instruction may be stored in a computer readable storage medium. When executed by the processor, the computer readable instruction may implement the steps of each method embodiment. The computer readable instruction includes a computer readable instruction code, which may be in source code form, object code form, executable file, or some intermediate forms, etc. The computer readable instruction may include: any entity or device capable of carrying the computer-readable instruction code, recording medium, USB flash disk, mobile hard disk, magnetic disk, CD, computer memory, Read-Only Memory (ROM), Random Access Memory (RAM), electrical carrier signal, telecommunication signal, software distribution medium, etc. It is to be noted that the contents included in the computer-readable medium may be increased or decreased as appropriate in accordance with the requirements of the legislation and patent practice in the judicial district. For example, in some judicial districts, the computer-readable medium does not include the electrical carrier signal and the telecommunication signal according to the legislation and patent practice.

Although not shown, the server 3 may also include a power source (such as a battery) that supplies power to each component. Preferably, the power supply may be logically connected to the at least one processor 33 through a power management system, so as to realize the functions of charge management, discharge management, and power consumption management through the power management system. The power supply may also include one or more DC or AC power supplies, a recharging system, a power fault detection circuit, a power converter or inverter, a power state indicator, and any other component. The server 3 may also include a Bluetooth module, a Wi-Fi module, etc., which will not be described here.

In an embodiment, a non-transitory computer readable storage medium storing a computer readable instruction are provided. The non-transitory computer-readable storage medium stores a computer readable instruction. The computer readable instruction, when executed by one or more processors, enables the one or more processors to implement the method for accelerated detection of objects in videos in the above embodiment, which will not be described here to avoid repetition. The non-transitory computer readable storage medium in the embodiment includes a non-volatile readable storage medium and a volatile readable storage medium. Those of ordinary skill in the art may understand that all or a part of flows of the method in the above embodiments may be completed by related hardware instructed by a computer readable instruction. The computer readable instruction may be stored in a nonvolatile readable storage medium or a volatile readable storage medium. When executed, the computer readable instruction may include the flows in the embodiments of the method.

It should be understood that the embodiments are for illustrative purposes only and are not limited to the structure in the scope of the patent application.

In several embodiments provided by the application, it should be understood that the disclosed electronic device and method may be implemented in another manner. For example, the electronic device embodiment described above is only schematic; for example, the division of the units is only a division of logical function and may be implemented in an alternate manner.

In addition, each functional unit in each embodiment of the application may be integrated into the same processing unit, each unit may also physically exist independently, and two or more than two units may also be integrated into the same unit. The integrated unit may be realized in form of hardware or in form of hardware plus software function module.

For those of ordinary skill in the art, it is apparent that the application is not limited to the details of the above exemplary embodiments and can be realized in other specific forms without deviating from the spirit or basic characteristics of the application. Therefore, in all respects, the embodiments should be regarded as exemplary and nonrestrictive, and the scope of the application is limited by the attached claims rather than the above description, so all changes within the meaning and scope of the equivalent elements of the claims are intended to be included in the application. Any reference number in the claims shall not be regarded as a limit to the claim involved. In addition, it is apparent that term "include" does not exclude other units, and the singular does not exclude the plural. Multiple units or devices described in a system claim may also be realized by a unit or device through software or hardware. Terms "first" and "second" are used for denoting names, not any particular order.

Finally, it is to be noted that the above embodiments are used only to illustrate the technical solution of the application and not to limit it. Although the application is described in detail with reference to the preferred embodiments, those of ordinary skill in the art should understand that the technical solution of the application may be modified and replaced equally without departing from the spirit and scope of the technical solution of the application.

What is claimed is:

1. A method for accelerated detection of objects in videos, the method comprising:
    dividing all frame images in video images into preset groups of frame images, wherein each group of frame images comprises a keyframe image and a non-keyframe image;
recognizing a detection object in the keyframe image, and marking a detection box on the detection object;
    recognizing a detection object in the non-keyframe image of the preset group of frame images, scaling up the detection box in the keyframe image at a preset scale to generate a preselection box, and marking the detection object in the non-keyframe image through the preselection box;
    cropping the non-keyframe image according to the preselection box to obtain a plurality of preselection box images;
    inputting the plurality of preselection box images into a non-keyframe detection network to obtain a location of the detection object in the preselection box; and
mapping the detection object to an original image corresponding to the non-keyframe according to the location of the detection object in the preselection box,
    wherein recognizing the detection object in the non-keyframe image of the preset group of frame images, scaling up the detection box in the keyframe image at the preset scale to generate the preselection box, and marking the detection object in the non-keyframe image through the preselection box comprises:
        recognizing a detection object in a current non-keyframe image of the preset group of frame images;
        scaling up a detection box in a previous keyframe image corresponding to the current non-keyframe image at a preset scale to generate a preselection box, and marking the detection object in the current non-keyframe image through the preselection box;
        recognizing a detection object in a next non-keyframe image corresponding to the current non-keyframe image; and
        scaling up the preselection box in the current non-keyframe image at a preset scale to generate a first preselection box, and marking the detection object in the next non-keyframe image corresponding to the current non-keyframe image through the first preselection box, and so on, until detection objects in all non-keyframe images of the preset groups of frame images are marked.
2. The method for accelerated detection of objects in videos as claimed in claim 1, further comprising before inputting the plurality of preselection box images into the non-keyframe detection network:
    scaling the plurality of preselection box images.
3. The method for accelerated detection of objects in videos as claimed in claim 1, wherein the non-keyframe network is a deep learning neural network for obtaining the location of the detection object in the image.
4. The method for accelerated detection of objects in videos as claimed in claim 1, wherein recognizing the detection object in the keyframe image comprises:
    sliding on the keyframe images in a preset order through sliding windows with different window sizes;
    for each sliding, inputting an image corresponding to a current window into a pre-trained classifier; and
    when the classifier outputs a classification probability greater than a preset value after processing the image corresponding to the current window, confirming that the detection object in the keyframe image is recognized, and outputting the mark of the detection object.
5. The method for accelerated detection of objects in videos as claimed in claim 4, further comprising:
    filtering marks of the detection objects to obtain the detection object in the keyframe image.
6. The method for accelerated detection of objects in videos as claimed in claim 5, wherein filtering the marks of the detection objects to obtain the detection object in the keyframe image comprises:
    arranging probabilities obtained after inputting the sliding windows into the classifier in a descending order, and selecting a sliding window corresponding to the maximum classification probability;
    respectively calculating overlapping areas between the other sliding windows and the sliding window corresponding to the maximum classification probability, and determining whether the overlapping areas are greater than a preset area;
    for an overlapping area less than or equal to the preset area, retaining a corresponding sliding window and outputting a detection object corresponding to the sliding window;
for an overlapping area greater than the preset area, deleting a corresponding sliding window; and
    repeating the above until all the other sliding windows are compared.
7. A server, comprising:
    a processor and a memory, wherein the processor, when executing a computer readable instruction stored in the memory, implements:
        dividing all frame images in video images into preset groups of frame images, wherein each group of frame images comprises a keyframe image and a non-keyframe image;
recognizing a detection object in the keyframe image, and marking a detection box on the detection object;
    recognizing a detection object in the non-keyframe image of the preset group of frame images, scaling up the detection box in the keyframe image at a preset scale to generate a preselection box, and marking the detection object in the non-keyframe image through the preselection box;
    cropping the non-keyframe image according to the preselection box to obtain a plurality of preselection box images;
    inputting the plurality of preselection box images into a non-keyframe detection network to obtain a location of the detection object in the preselection box; and
    mapping the detection object to an original image corresponding to the non-keyframe according to the location of the detection object in the preselection box,
    wherein to implement recognizing the detection object in the non-keyframe image of the preset group of frame images, scaling up the detection box in the keyframe image at the preset scale to generate the preselection box, and marking the detection object in the non-keyframe image through the preselection box, the processor, when executing the computer readable instruction stored in the memory, implements:
  recognizing a detection object in a current non-keyframe image of the preset group of frame images;
  scaling up a detection box in a previous keyframe image corresponding to the current non-keyframe image at a preset scale to generate a preselection box, and marking the detection object in the current non-keyframe image through the preselection box;
  recognizing a detection object in a next non-keyframe image corresponding to the current non-keyframe image; and
  scaling up the preselection box in the current non-keyframe image at a preset scale to generate a first preselection box, and marking the detection object in the next non-keyframe image corresponding to the current non-keyframe image through the first preselection box, and so on, until detection objects in all non-keyframe images of the preset groups of frame images are marked.

8. The server as claimed in claim 7, wherein the processor, when executing the computer readable instruction stored in the memory, further implements before inputting the plurality of preselection box images into the non-keyframe detection network:
  scaling the plurality of preselection box images.

9. The server of claim 7, wherein the non-keyframe network is a deep learning neural network for obtaining the location of the detection object in the image.

10. The server as claimed in claim 7, wherein to implement recognizing the detection object in the keyframe image, the processor, when executing the computer readable instruction stored in the memory, implements:
  sliding on the keyframe images in a preset order through sliding windows with different window sizes;
  for each sliding, inputting an image corresponding to a current window into a pre-trained classifier; and
  when the classifier outputs a classification probability greater than a preset value after processing the image corresponding to the current window, confirming that the detection object in the keyframe image is recognized, and outputting the mark of the detection object.

11. The server as claimed in claim 10, wherein the processor, when executing the computer readable instruction stored in the memory, further implements:
  filtering marks of the detection objects to obtain the detection object in the keyframe image.

12. The server as claimed in claim 11, wherein to implement filtering the marks of the detection objects to obtain the detection object in the keyframe image, the processor, when executing the computer readable instruction stored in the memory, implements:
  arranging probabilities obtained after inputting the sliding windows into the classifier in a descending order, and selecting a sliding window corresponding to the maximum classification probability;
  respectively calculating overlapping areas between the other sliding windows and the sliding window corresponding to the maximum classification probability, and determining whether the overlapping areas are greater than a preset area;
  for an overlapping area less than or equal to the preset area, retaining a corresponding sliding window and outputting a detection object corresponding to the sliding window;
  for an overlapping area greater than the preset area, deleting a corresponding sliding window; and
  repeating the above until all the other sliding windows are matched.

13. A non-transitory computer readable storage medium that stores a computer readable instruction, wherein the computer readable instruction, when executed by one or more processors, enables the one or more processors to perform:
  dividing all frame images in video images into preset groups of frame images, wherein each group of frame images comprises a keyframe image and a non-keyframe image;
recognizing a detection object in the keyframe image, and marking a detection box on the detection object;
  recognizing a detection object in the non-keyframe image of the preset group of frame images, scaling up the detection box in the keyframe image at a preset scale to generate a preselection box, and marking the detection object in the non-keyframe image through the preselection box;
  cropping the non-keyframe image according to the preselection box to obtain a plurality of preselection box images;
  inputting the plurality of preselection box images into a non-keyframe detection network to obtain a location of the detection object in the preselection box; and
  mapping the detection object to an original image corresponding to the non-keyframe according to the location of the detection object in the preselection box,
  wherein to perform recognizing the detection object in the non-keyframe image of the preset group of frame images, scaling up the detection box in the keyframe image at the preset scale to generate the preselection box, and marking the detection object in the non-keyframe image through the preselection box, the computer readable instruction, when executed by the one or more processors, enables the one or more processors to perform:
    recognizing a detection object in a current non-keyframe image of the preset group of frame images;
    scaling up a detection box in a previous keyframe image corresponding to the current non-keyframe image at a preset scale to generate a preselection box, and marking the detection object in the current non-keyframe image through the preselection box;
    recognizing a detection object in a next non-keyframe image corresponding to the current non-keyframe image; and
    scaling up the preselection box in the current non-keyframe image at a preset scale to generate a first preselection box, and marking the detection object in the next non-keyframe image corresponding to the current non-keyframe image through the first preselection box, and so on, until detection objects in all non-keyframe images of the preset groups of frame images are marked.

14. The non-transitory computer readable storage medium as claimed in claim 13, wherein the computer readable instruction, when executed by the one or more processors, enables the one or more processors to further perform before inputting the plurality of preselection box images into the non-keyframe detection network:

scaling the plurality of preselection box images.

15. The non-transitory computer readable storage medium as claimed in claim 13, wherein to perform recognizing the detection object in the keyframe image, the computer readable instruction, when executed by the one or more processors, enables the one or more processors to perform:
   sliding on the keyframe images in a preset order through sliding windows with different window sizes;
   for each sliding, inputting an image corresponding to a current window into a pre-trained classifier; and
   when the classifier outputs a classification probability greater than a preset value after processing the image corresponding to the current window, confirming that the detection object in the keyframe image is recognized, and outputting the mark of the detection object.

16. The non-transitory computer readable storage medium as claimed in claim 15, wherein the computer readable instruction, when executed by the one or more processors, enables the one or more processors to further perform:
   filtering marks of the detection objects to obtain the detection object in the keyframe image.

17. The non-transitory computer readable storage medium as claimed in claim 16, wherein to perform filtering the marks of the detection objects to obtain the detection object in the keyframe image, the computer readable instruction, when executed by the one or more processors, enables the one or more processors to perform:
   arranging probabilities obtained after inputting the sliding windows into the classifier in a descending order, and selecting a sliding window corresponding to the maximum classification probability;
   respectively calculating overlapping areas between the other sliding windows and the sliding window corresponding to the maximum classification probability, and determining whether the overlapping areas are greater than a preset area;
   for an overlapping area less than or equal to the preset area, retaining a corresponding sliding window and outputting a detection object corresponding to the sliding window;
for an overlapping area greater than the preset area, deleting a corresponding sliding window; and
   repeating the above until all the other sliding windows are compared.

* * * * *